United States Patent [19]

Learned

[11] 4,050,109
[45] Sept. 27, 1977

[54] SELF-PROPELLED AND CONTAINED TRAILER WASHING MACHINE

[76] Inventor: Samuel M. Learned, R.D. No. 1, Port Townsend, Wash. 98368

[21] Appl. No.: 747,017

[22] Filed: Dec. 2, 1976

[51] Int. Cl.² .............................................. B60S 3/06
[52] U.S. Cl. ............................... 15/53 A; 15/DIG. 2
[58] Field of Search .............. 15/DIG. 2, 53 R, 53 A, 15/53 AB, 97 R; 134/45, 123

[56] References Cited

U.S. PATENT DOCUMENTS

| | | | |
|---|---|---|---|
| 2,865,034 | 12/1958 | Petite | 15/53 A |
| 3,581,335 | 6/1971 | Saxonmeyer | 15/53 A |
| 3,772,723 | 11/1973 | Krimm | 15/53 AB |

Primary Examiner—Edward L. Roberts
Attorney, Agent, or Firm—Samuel M. Learned, Jr.

[57] ABSTRACT

A self-propelled and contained trailer washing machine, operable by one individual, which machine is comprised of an integrally powered and steerable wheel mounted rigid frame structure configured to straddle the height and width dimensions of a typical over-the-road commercial trailer so that when the washing machine is operator-aligned to straddle a trailer and then driven along the longitudinal dimension thereof, on such a single driven pass the exterior surfaces of the trailer are automatically washably cleaned by the operator first activating a selected material application pump which supplies an operator controlled amount of a suitable fluid cleaning material directed through a spray arch from one of a plurality of tanks mounted within and carried upon the rigid frame structure, followed by operator activation of a set of spaced frame structure mounted laterally adjustable vertical rotary brushes which simultaneously engage and by opposing rotary motion scrub the respective trailer sides concurrent with driven washing machine displacement along the longitudinal dimension thereof, and lastly, operator activation of a piston pump which supplies high pressure water through a rinse arch from one of a plurality of water tanks also mounted within and carried upon the rigid frame structure whereby there is accomplished a directed high pressure rinsable removal and flushing of soil and residue material from the external trailer surfaces to complete the single pass washable cleaning thereof.

5 Claims, 9 Drawing Figures

SELF-PROPELLED AND CONTAINED TRAILER WASHING MACHINE

BACKGROUND OF THE INVENTION

The instant invention relates to a self-propelled and contained trailer washing machine driven and operable by one individual, wherein said machine provides a single-pass operator-controlled capability for cleaning large over-the-road commercial and common carrier trailer units such as those currently in general and widespread use throughout this and other countries.

Under the circumstances of current and increasing competitive conditions, whether it be in the case of commercial trailer units owned or leased for product and goods transport by private companies, or in the event of a common carrier fleet owner, there is more and more a cognizance by operators that the company image presented and created in the public mind as regards a particular company is in many respects directly associated with the condition of appearance of their equipment on the public highways. However, notwithstanding the favorable public relations aspects of having clean equipment on the roads, there is also the practical aspect of cost reduction obtained through proper equipment maintenance, including reduction of damage to trailers due to road grime, salt, and other causes consequent from not conducting a systematic trailer cleaning program.

In the past, trailer cleaning operations were primarily carried out by manual labor employing relatively simple mechanical spray application and rinse equipment supplemented by manual brushing as necessary. The manual trailer washing method is slow, and with increasing labor rates has also become increasingly expensive. However, the need for trailer cleaning maintenance continues, and has given rise to the development of increasingly mechanized means to accomplish trailer washing at a greater unit output with less man power. Also, in the case of small fleet operations, there has developed an industry based upon providing contract trailer cleaning service, which to remain competitive, likewise has created a demand for highly mobile and operationally efficient mechanized trailer washing equipment.

In general, the prior art trailer washing machine disclosures are comprised of the following major types. First, statically positioned and adjustably spaced vertically disposed rotary brush and spray arch unit machines wherein a trailer to be washed is towed to and through the machine by means of a driver-operated tractor, exemplary of which is that machine as taught in U.S. Pat. No. 2,983,937 to Tytler et al, dated May 16, 1961. A modification on the above-cited Tytler et al disclosure is that as taught in U.S. Pat. No. 3,772,723 to Krimm, dated Nov. 20, 1973, wherein the washing machine operational units per se are mounted upon a prime mover thereby enabling mobile displacement of the washing machine from one wash site use location to another, but, when situate in use position at a displaced wash site location the washing machine per se, relative to the trailer to be washed, is static and the trailer to be washed must, once again, be towed to and through the machine by means of a driver-operated tractor. Also, in the above-cited disclosure to Krimm there are no means provided therein for self-contained washing material and rinse water capabilities, thereby restricting the use locations to places where there would at least be provided an ample and convenient water supply source.

A second general type of trailer washing machine is exemplified by that as taught in U.S. Pat. No. 2,804,635 to Wilson, dated Sept. 3, 1957, wherein the washing machine is comprised of a relatively simple manually mobile unit connected to sources of water and power and is employed by the operator working the machine from a start position along a statically located trailer, therearound and back, in order to accomplish washing of the trailer. Again, the trailer must be towed to and away from the washing site use location since the machine, practically speaking, is restricted in range of mobility as a consequence of being connected to both sources of power and water supply, in addition to the washing cycle duration being limited by and subject to the operator skill and disposition as a consequence of the manually mobile feature thereof.

The third general type of trailer washing machine is exemplified by those having a single vertically disposed rotary brush and vertical spray pipes for washing material application and rinse water flushing all assembled upon a self-propelled primary mover, having independent power means, and further having self-contained washing material and rinse water capabilities, all as respectively taught in U.S. Pat. No. 2,636,198 to Wilson, dated Apr. 28, 1953; U.S. Pat. No. 2,876,472 to Rousseau, dated Mar. 10, 1959; and U.S. Pat. No. 2,950,492 to Liekweg, dated Aug. 30, 1960. Clearly, trailer washing machines having features of those classed under the third general type provide a much higher versatility capability in use application over those previously discussed in that a single driver/operator has the means of moving the washing machine from one trailer location to another at a use site irrespective of whether there are power or water sources available, power washing and rinsing each trailer at its location, and thereafter mobily displacing the entire washing machine unit from one wash site use location to another. However, the single brush capability is a limiting factor.

Lastly, there is a fourth general type of trailer washing machine, which is portable relative to displacement from one wash site use location to another, features modified self-contained washing material and rinse water capabilities, and self-propelled opposingly spaced vertically disposed rotary brush means and spray pipes for washing material application and rinse water flushing, all of which is as set forth and taught in U.S. Pat. No. 3,543,319 to Posner, dated Dec. 1, 1970. Under this fourth category of general types of trailer washing machines, however, one becomes involved with the more sophisticated and expensive equipment, and also equipment which requires assembly and disassembly at the wash site use location prior to and after utilization thereby also requiring that more than one individual be employed in order to assist in the equipment erection and dismantling at a wash site use location. Additionally, the utilization mobility of the washing machine per se is somewhat restricted by the slaving thereof through hose connection to the wash material and rinse water tanks separately carried upon the prime mover, as well as there being de minimis steering control capability over the self-propelled washing machine arch assembly.

It should be understood that some of the features of the instant invention have, in some cases, structural and functional similarities to teachings separately set forth in the prior art disclosures heretofore cited and briefly discussed. However, as will hereinafter be pointed out, the instant invention is distinguishable from said earlier inventions in one or more ways in that the present invention has utility features and new and useful advantages, applications, and improvements in the art of self-propelled and contained trailer washing machines not heretofore known.

SUMMARY OF THE INVENTION

It is the principal object of the present invention to provide a self-propelled and contained trailer washing machine comprised of a rigid frame structure mobily assembled upon a plurality of suitable moving and steering wheels, said trailer washing machine being provided with an integral power means to drive both said machine and the auxiliary equipment assembled thereon whereby the same are maneuverable and operable through suitable control means as accomplished by a single driver/operator, wherein the configuration of said trailer washing machine is accommodated to straddle the height and width dimensions of a typical over-the-road commercial trailer and upon a single operator-driven trailer straddling pass of said machine along the longitudinal dimension of said trailer concurrently accomplish operator controlled automatic washable cleaning of the external surfaces thereof by said operator sequentially activating a directed cleaning material spray application means pumpably supplied through conduit means communicating from one of a plurality material of cleaning storage tanks assembled within and carried upon said rigid frame structure of said trailer washing machine, followed by operator activation of a set of laterally spaced vertically disposed rotary brushes one each of which respectively engages the opposite side elevation of the trailer body and scrubs the same during progressive machine displacement along the longitudinal dimension thereof, then followed by operator activation of a directed high pressure rinse water spray application means pumpably supplied through other conduit means communicating from one of a plurality of water storage tanks assembled within and carried upon said rigid frame structure of said trailer washing machine whereby the aforementioned high pressure rinse water spray application accomplishes soil and residue material removal and flushing of the same from said external trailer surfaces to accomplish the completed washable cleaning thereof.

It is another object of the present invention to provide a trailer washing machine having material application control means wherein the operator thereof may adjust the quantity of washing material to be applied in accordance with that amount reasonably needed in order to accomplish satisfactory trailer cleaning results, thereby also providing a means for conserving washing material which would otherwise be wasted in the absence of such a material application control capability.

It is a further object of the present invention to provide a trailer washing machine with separate conduit means for the spray application of detergent cleaning material and acid cleaning material, thereby eliminating the need for purging lines with fresh rinse water which would otherwise be necessary if a single conduit means were employed for application of both detergent cleaning material and acid cleaning material, and thereby also further conserving washing materials, as well as rinse water, which would otherwise be wasted in accomplishing the conduit purging operation.

Still another object of the present invention is to provide a trailer washing machine having laterally spaced vertically disposed rotary brush units being laterally adjustable by automatic compensating means in order to accommodate the washing of trailers having either a smooth or a longitudinally or vertically ribbed exterior surface.

It is yet another object of the present invention to provide a trailer washing machine capable of washing trailers at a much higher unit output per man hour than is currently capable with presently available equipment.

It is an additional object of the present invention to provide a trailer washing machine which accomplishes trailer washing operations at the washing site location where the trailers are parked without the additional need, necessity, or cost of towing the trailers for washing to or from the trailer washing machine location position.

It is also an object of the present invention to provide a trailer washing machine capable of accomplishing trailer washing operations without the need to construct, maintain, light and heat a capital cost structure such as a conventional wash bay building.

A further object of the present invention is to provide a trailer washing machine which is more versatile and safe in use application, at a reduced cost, from those static installations and otherwise self-propelled and contained trailer washing machine units of generally equivalent ultimate trailer washing capability currently available.

DETAILED DESCRIPTION OF THE INVENTION

Figure 1:
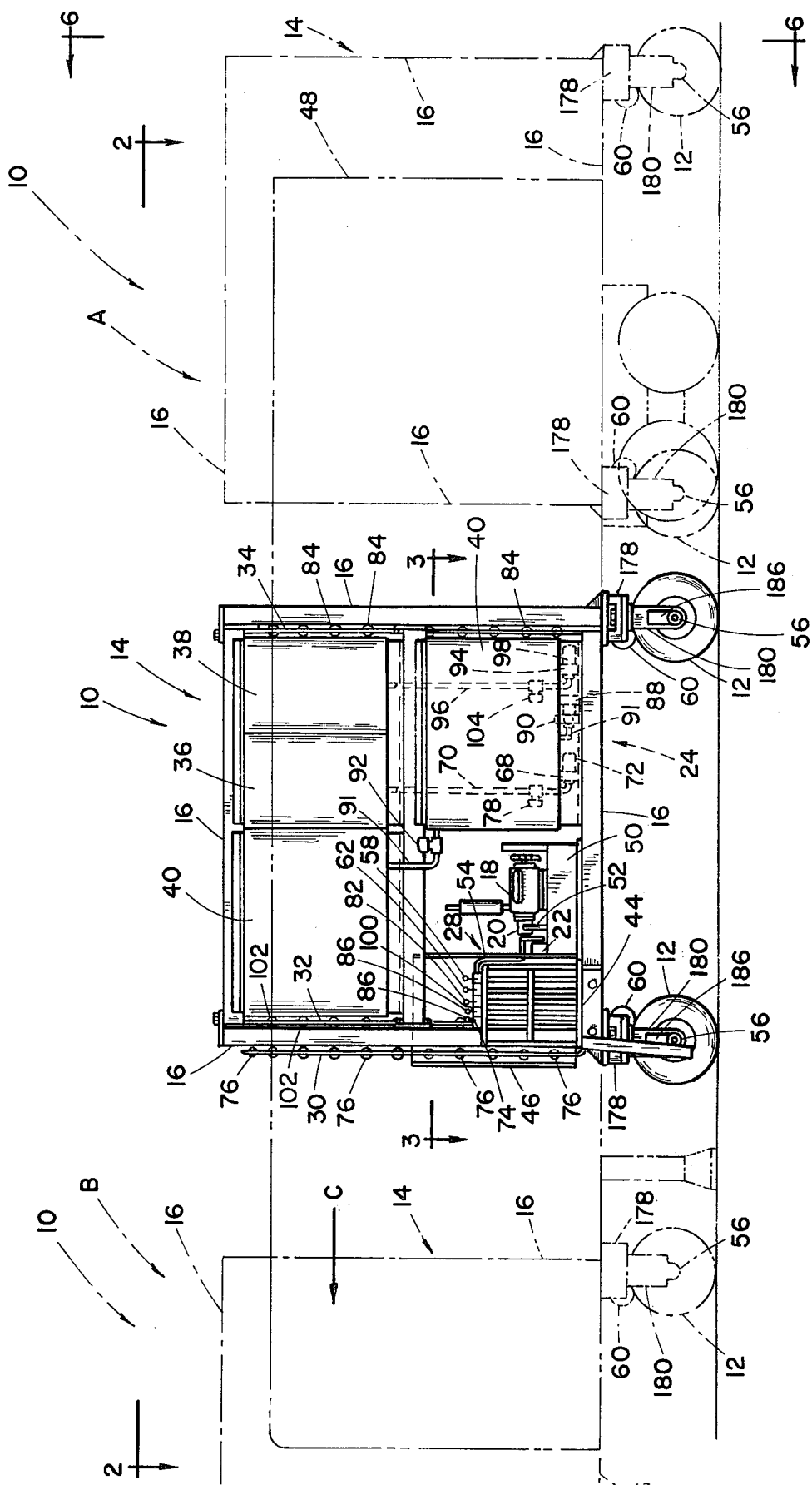
FIG. 1 is a side elevation of the self-propelled and contained trailer washing machine comprising the instant invention, the same being shown in a typical operational wash cycle use position relative to an exemplary trailer, also showing therein phantom views of said machine respectively at the beginning and end positions of a wash cycle use application.

Referring to FIG. 1, the present invention is shown which comprises a self-propelled and contained trailer washing machine 10 mounted upon driving and steering wheels 12, said machine 10 having a rigid supporting frame structure 14 comprised of interconnected horizontally and vertically disposed structural support members 16, an internal combustion engine power unit 18 which drives both a hydraulic pump 20 and an electrical generator 22 that respectively in turn provide drive power for said wheels 12 and material application pumps 24 as well as the hydraulically driven vertically disposed rotary brushes 26 (not shown in FIG. 1, but illustrated in FIG. 2 and certain subsequent Figures) through control console 28, a detergent material application spray arch 30, a brightener material application spray arch 32, and a high pressure rinse water spray arch 34, in addition to a detergent material supply tank 36, a brightener material supply tank 38, and rinse water supply tanks 40, plus a driver/operator station 44 protectively enclosed by a transparent plastic shield 46.

Referring again to FIG. 1 to describe in greater detail the component parts of this invention as well as explain the operation thereof, wherein is also shown an exemplary over-the-road trailer unit 48 to be washably cleaned by employment of said machine 10, in addition to there being respectively shown phantom views "A" and "B" of said machine 10 which serve to illustrate the progressive straddling movement thereof along the longitudinal dimension of said trailer unit 48 during the accomplishment of a single pass washable cleaning operation, with the arrow "C" designating the direction of travel of said machine 10.

In use application said machine 10 is driven by the driver/operator thereof to a parked trailer at the washing site location and steerably maneuvered into alignment so that the arch structure of said machine 10 is positioned to straddle the height and width dimensions of a trailer unit 48 to be washably cleaned. The above-referenced alignment position of said machine 10 is as more clearly illustrated in FIG. 6, to be described and discussed in detail hereinafter. Hydraulic power, however, provides the force means by which said machine 10 is propelled and maneuvered, and is supplied to all four driving and steering wheels 12 equally through the control console 28 by means of a hydraulic power system comprised of the hydraulic pump 20 driven by the internal combustion engine power unit 18, the hydraulic reservoir 50 which supplies hydraulic fluid to the hydraulic pump through suction line 52, and the hydraulic fluid feed line 54 which delivers pressurized hydraulic fluid from said pump 20 to the control console 28 whereby means are provided to accomplish hydraulically powered displacement speed and directional course control functions of said machine 10. The displacement, and displacement speed functions of said machine 10 are powered by the hydraulic wheel drive motors 56, all of which, as previously stated, are driven and controlled equally through the control console 28 and thereby operate in unison to provide uniform speed in either forward or reverse traversing motion. On the control console 28 the hydraulic wheel drive motor control lever 58 provides the machine 10 displacement and speed control functions above-mentioned.

The steering functions of said machine 10 are likewise hydraulically powered, also equally through said control console 28 by means of the hydraulic power system aforementioned, through hydraulic wheel steering motors 60 that also operate in unison to provide uniform directional course steering displacement in either forward or reverse traversing motion. On the control console 28 the hydraulic wheel steering motor control lever 62 provides the machine 10 directional course steering functions above-mentioned.

Upon self-propelled power driven alignment of said machine 10 with a trailer unit 48 to be washably cleaned, by employment of driving and steering control means above-described, depending primarily upon the trailer unit finish, i.e., whether it be a painted finish or a bare metal finish such as aluminum or stainless steel, the driver/operator will determine if detergent material or a brightener material should be utilized in accomplishing cleaning operations. Generally, in the case of a trailer unit having a painted finish the driver/operator will select application of a detergent material by means of the detergent material by means of the detergent material application spray arch 30 followed by scrubbing with the vertically disposed rotary brushes 26 and then a high pressure water rinse by means of the high pressure rinse water spray arch 34 to accomplish removal and flushing of soil and residue material from the external trailer unit surfaces and thereby complete the single pass washable cleaning of a painted finish trailer unit. In the case of a trailer unit having a bare metal aluminum finish, the driver/operator will select application of a brightener material (an acid based cleaner containing wetting agent components) by means of the brightener material application spray arch 32, which may or may not be followed by scrubbing with the vertically disposed rotary brushes 26, then followed by a high pressure water rinse by means of of said high pressure rinse water spray arch 34 as above-described. However, in the case of a trailer unit having a bare metal stainless steel finish, the driver/operator may optionally select the application of either a detergent or brightener material, which is then followed by scrubbing with the vertically disposed rotary brushes 26 and a high pressure water rinse by means of said high pressure rinse water spray arch 34. In any event, said machine 10 provides the self-contained cleaning material and equipment selective combination capability to accomplish a single pass washable cleaning of any exemplary over-the-road trailer unit 48 external surface irrespective of the finish thereof, and upon a driver/operator determination of which of said machine 10 cleaning material and cleaning equipment capability combinations to employ with said machine 10 situate in a stradably aligned position relative to a trailer unit 48 as previously described, said driver/operator is ready to commence with cleaning operations.

Presuming in the first instance that said trailer unit 48 presents a painted finish for washable cleaning, to be accomplished by means of detergent material application followed by vertically disposed rotary brush scrubbing and then a high pressure water rinse removal and flushing of soil and residue material from the external trailer unit surfaces. Controlled low pressure detergent material application is accomplished by means of activating the detergent material application centrifugal pump 68, communicating with the detergent material supply tank 36 through the detergent material supply line 70, said pump 68 being variably driven and controlled electrically by direct current supplied from the electrical generator 22 to the direct current detergent material application centrifugal pump drive motor 72 electrically fed through the control console 28 and adjusted by the detergent material application centrifugal pump drive motor control lever 74. By variably controlling the detergent material application centrifugal pump speed as above-described, the detergent material pressure head in the detergent material application spray arch 30, and consequently, the rate and volume of detergent material application to the back doors, side panels, and front panel of said trailer unit 48 through the detergent material spray nozzles 76 is controlled, i.e., the higher the detergent material application centrifugal pump speed the greater the detergent material application spray arch pressure head and the rate and volume of detergent material application. Also, in the foregoing respect, the detergent material pressure head from the detergent material supply tank 36 in the detergent material application centrifugal pump intake is maintained at a constant value by means of the detergent material feed pressure head control solenoid 78.

As the driver/operator maneuvers said machine 10 forward from the aligned position aforedescribed to mobily straddle the trailer unit 48 to be washed, illustrated in phantom view "A" of FIG. 1, by means of the detergent material application centrifugal pump drive motor control lever 74 he activates the detergent material application centrifugal pump 68 at a speed commensurate with delivering that amount of spray applied detergent material necessary to suitably accomplish cleaning under the conditions encountered. It should be noted at this point that there are no detergent spray nozzles provided in the upwardly disposed horizontal pipe member which communicably connects the detergent material application spray arch vertically disposed pipe members.

Secondly, the driver/operator activates the vertically disposed rotary brushes 26 driven by the hydraulic brush drive motors 80 (neither of which are shown in FIG. 1, but both illustrated in detail in FIG. 4) through control console 28 by the hydraulic brush drive motor control lever 82, whereby scrubbable cleaning of said trailer unit 48 side panels is progressively accomplished as said brushes engage and traverse the longitudinal dimension of the trailer unit during driven displaceable movement of said machine 10 therealong. Lastly, the driver/operator activates the high pressure rinse water spray arch 34, which is provided with spray nozzles 84 in both of the vertically disposed pipe members as well as also in the communicably connecting upwardly disposed horizontal pipe member thereof, as said arch 34 moves into a stradable configuration with the top and sides of said trailer unit 48 and thereby accomplishes a high pressure rinse water removal and flushing of soil and residue material from the top, side panels, rear doors, and front panel of the painted finish trailer unit being washably cleaned.

Activation of the high pressure rinse water spray arch is accomplished by means of turning the knob switch 86 on the detergent material application centrifugal pump drive motor control lever 74 to the closed circuit position, which feeds governed electrical current to the piston pump drive motor 88 mechanically coupled to the high pressure rinse water piston pump 90 whereby constant head high pressure rinse water is pumpably delivered through the high pressure rinse water spray arch 34. In this case the rinse water pressure from the rinse water supply tank 40, delivered by way of the rinse water supply line 91 to the high pressure time water piston pump intake, is maintained at a constant value by means of the rinse water feed pressure head control solenoid 92.

Upon completion of washable cleaning by longitudinal displacement traversment of the trailer unit 48 by said machine 10 as generally illustrated in phantom view "B" of FIG. 1, the driver/operator thereof progressively deactivates the detergent material application spray arch 30, the vertically disposed rotary brushes 26, and the high pressure rinse water spray arch 34. The machine 10 is then steerably driven to another trailer unit position at the wash site location and washing operations continue as above-described.

Presuming in the second instance that said trailer unit 48 presents a bare metal aluminum finish for washable cleaning, to be accomplished by means of brightener material application followed by high pressure water rinse removal and flushing of soil and residue material from the external trailer unit surfaces. Controlled low pressure brightener material application is accomplished by means of activating the brightener material application centrifugal pump 94, communicating with the brightener material supply tank 38 through the brightener material supply line 96, said pump 94 being also variably driven and controlled electrically by direct current supplied from the electrical generator 22 to the direct current brightener material application centrifugal pump drive motor 98 electrically fed through control console 28 and adjusted by the brightener material application centrifugal pump drive motor control lever 100. Again, by variably controlling the brightener material application cenrifugal pump speed as above-described, likewise the brightener material pressure head in the brightener material application spray arch 32, and consequently, the rate and volume of brightener material application to the back doors, side panels, and front panel of said trailer unit 48 through the brightener material spray nozzles 102 is controlled, i.e., the higher the brightener material application centrifugal pump speed the greater the brightener material application spray arch pressure head and the rate and volume of brightener material application. Again, in the foregoing respect, the brightener material pressure head from the brightener material supply tank 38 to the brightener material application centrifugal pump intake is maintained at a constant value by means of the brightener material feed pressure head control solenoid 104.

By means of the brightener material application centrifugal pump drive motor control lever 100 the driver/operator activates the brightener material application centrifugal pump 94 at a speed commensurate with delivering that amount of spray applied brightener material necessary to suitably accomplish cleaning under the conditions encountered. It should also be noted at this point that there are no brightener material spray nozzles provided in the upwardly disposed horizontal pipe member which communicably connects the brightener material application spray arch vertically disposed pipe members.

As said driver/operator maneuvers said machine 10 forward from the aligned position, as previously described, to mobily staddle the trailer unit 48 to be washed he follows activation of the brightener material application centrifugal pump 94 with activation of the high pressure rinse water spray arch 34 also accomplished by means of turning the knob switch 86 on the brightener material application centrifugal pump drive motor control lever 100 to the closed position which then causes powering of the piston pump drive motor 88 mechanically coupled to the high pressure rinse water piston pump 90 whereby constant head high pressure rinse water is pumpably delivered through the high pressure rinse water spray arch 34 thereby removing the soil and residue material from the rear doors, top, side panels, and front panel of the trailer unit being washably cleaned, also as previously described.

In the event that said trailer unit 48 presents a bare metal stainless steel finish for washable cleaning, where either detergent or brightener material may be employed for cleaning purposes, followed by brushing and then high pressure rinse water removal flushing of soil and residue material therefrom, from said driver/operator would selectively employ the machine 10 capabilities respectively in the manners as heretofore described and set forth.

It is evident from the foregoing, as a consequence of having separate storage, pumping, conduit, and application spray means for both the detergent and brightener materials, there is no need or necessity for spray system purging with rinse water prior to use or re-use thereof.

Preferably, since the brightener material is comprised of an acid based fluid, the storage, pumping, and conduit components of the application means therefor are constructed of a suitable impervious plastic material. The balance of machine 10 as disclosed in FIG. 1 preferably is constructed of corrosive resistant metals, but any other suitable material or combinations thereof may be used.

Figure 2:
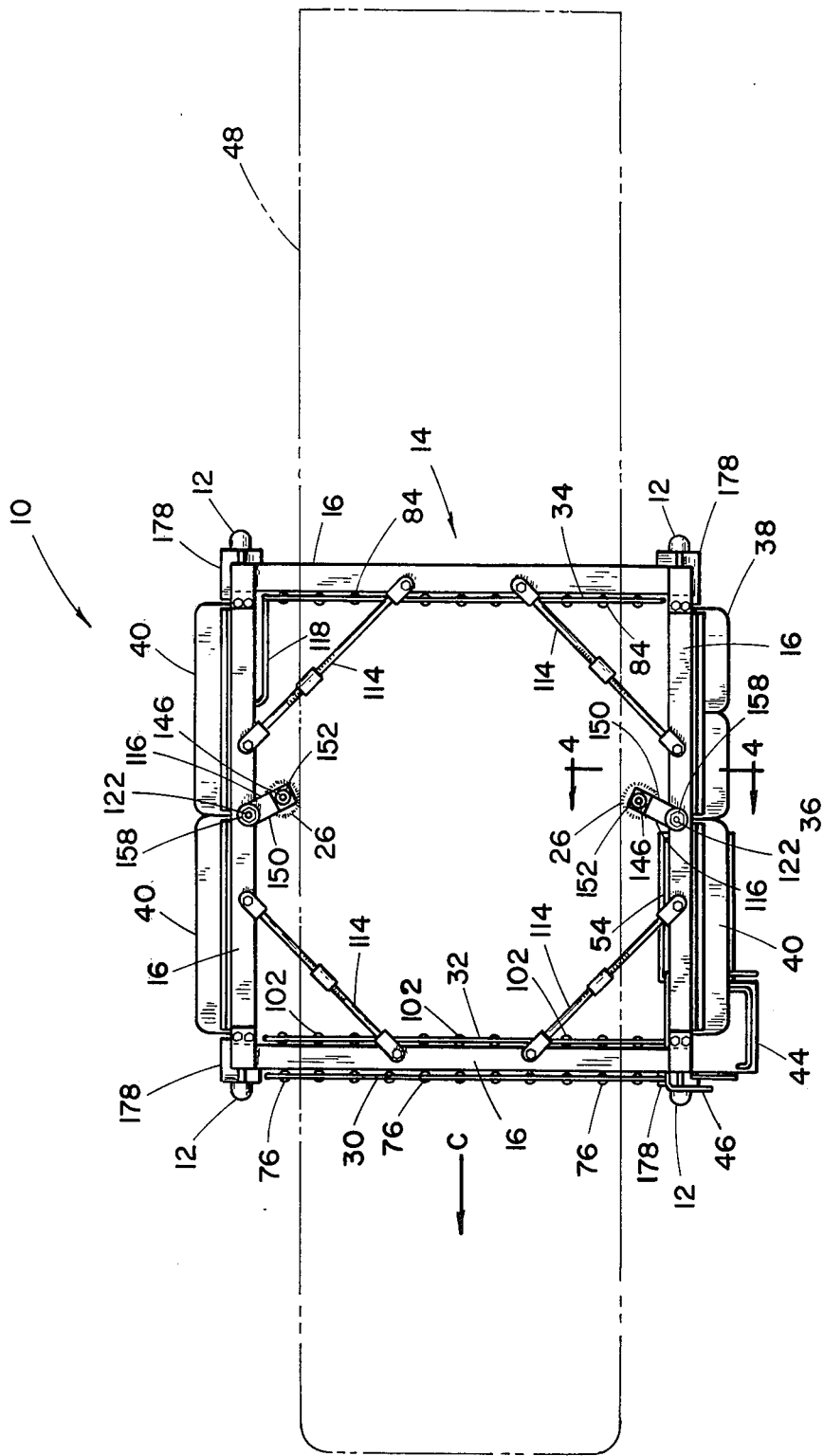
FIG. 2 is a top plan view of the washing machine shown in FIG. 21 as seen along the line 2 — 2 thereof.

Referring to FIG. 2, which is a top plan view of the side elevation of machine 10 shown in FIG. 1 as seen along the line 2 — 2 thereof, there is shown more specifically the configuration of component elements of said machine as heretofore described. Additionally shown in FIG. 2 are the threadably adjustable structural support brace struts 114 which serve to brace the machine 10 structural support members 16, the vertically disposed rotary brush mounting brackets 116 in which the vertically disposed rotary brushes 26 are retained and supported, and the high pressure rinse water spray arch supply line 118.

Figure 3:
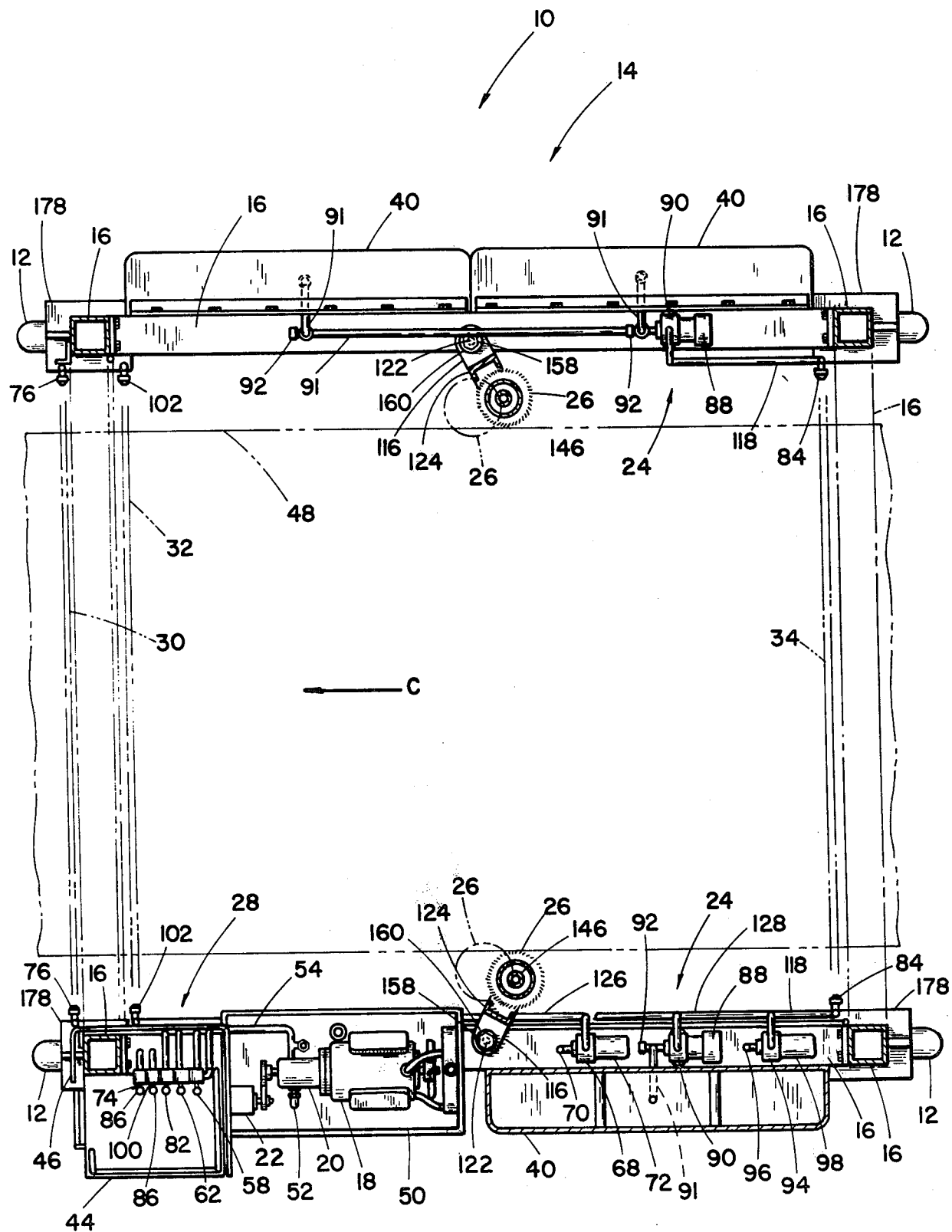
FIG. 3 is an enlarged top sectional view of the washing machine shown in FIG. 1 as seen along the line 3 — 3 thereof.

In FIG. 3 an enlarged top sectional view of the machine 10 shown in FIG. 1 as seen along the line 3 — 3 thereof is illustrated, wherein is also shown greater detail of the control console 28 and the driver/operator station 44, in addition to the internal combustion engine power unit 18 and the material application pumps 24. Further shown in FIG. 3 is the manner in which the vertically disposed rotary brushes 26 respectively engage and scrub the side panels of an exemplary over-the-road trailer unit 48 during the employment of machine 10 in accomplishing washing operations. The respective phantom views of said rotary brushes 26 illustrate the same when in a neutral non-operational configuration, wherein it is shown that the laterally disposed spacing of said rotary brushes is such as to be less than that of the lateral dimension of the smallest trailer unit 48 to be washably cleaned. As is shown respectively in FIG. 4 and FIG. 5, the brush mounting brackets 116 are provided with a hydraulic compression cylinder 120 fed with low pressure hydraulic fluid through the control console 28 such that when said rotary brushes 26 engage the side panels of a trailer unit 48 to be washably cleaned, irrespective of whether said side panels present a smooth or a vertically or longitudinally ribbed surface, the respective brush mounting brackets 116 pivotally deflect rearward from the direction of travel "C" of said machine 10, about the respective stationarily positioned brush mounting bracket pivot bolts 122 and against the compressive force of said cylinders 120, thereby enabling said machine 10 to automatically accommodate washable cleaning of various trailer units 48 having different lateral dimension and side panel surfaces as illustrated by the respective nonphantom top views of the vertically disposed rotary brushes 26 shown in FIG. 3. Also shown in FIG. 3 are the channel support members 124 of the vertically disposed rotary brush mounting brackets 116, as well as the detergent material application spray arch supply line 126 and the brightener material application spray arch supply line 128.

Figure 4:
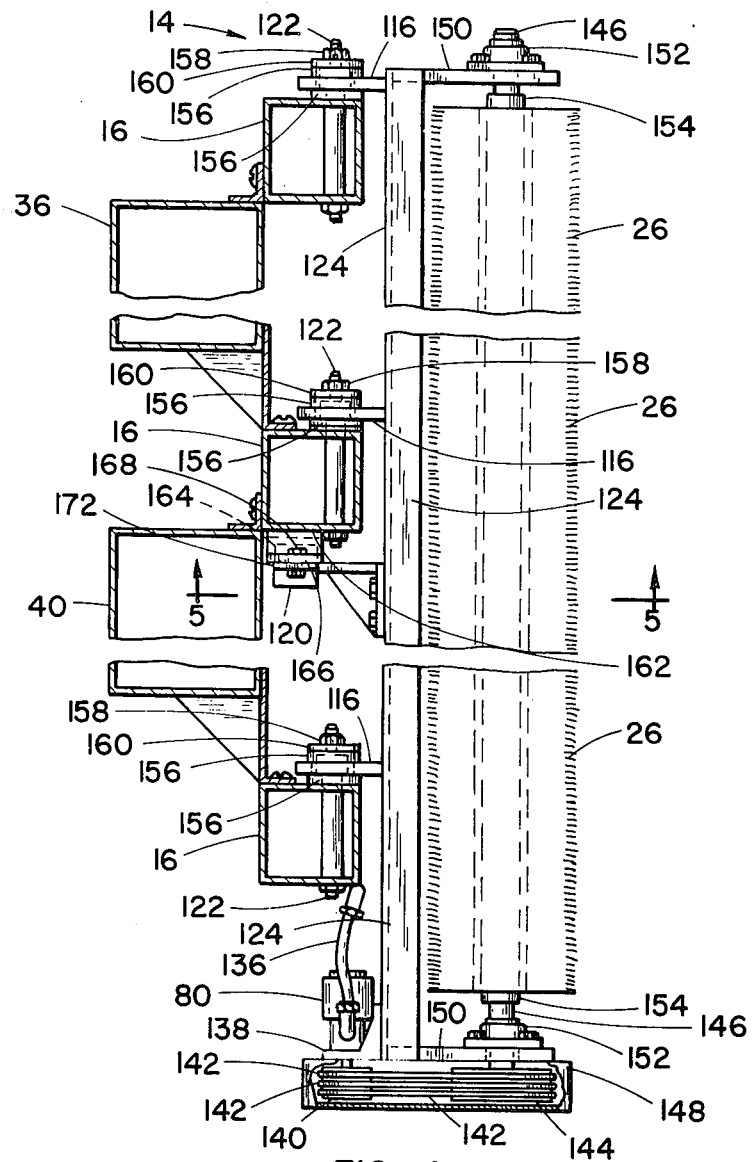
FIG. 4 is an enlarged end sectional elevation of a brush unit of the instant invention as shown in FIG. 2 and seen along the line 4 — 4 thereof foreshortened to accommodate the sheet.
Figure 5:
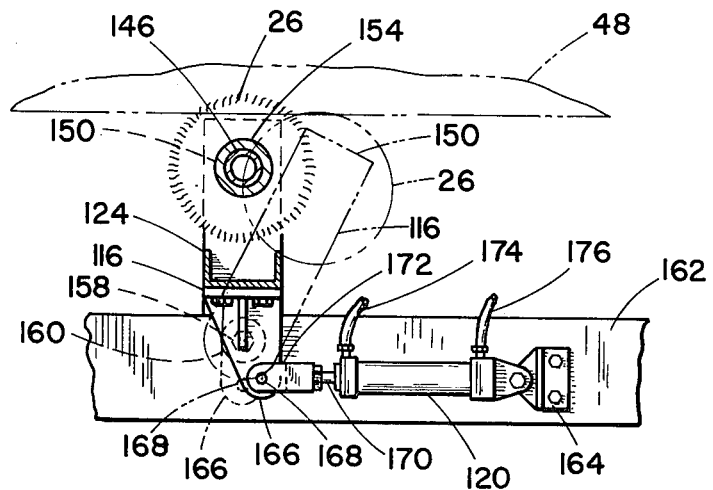
FIG. 5 is an enlarged bottom sectional view of the brush unit positioning and return cylinder assembly shown in FIG. 4 as seen along the line 5 — 5 thereof.

Referring now to FIG. 4 and FIG. 5 wherein are respectively illustrated the vertically disposed rotary brush drive and compression cylinder positioning means. As previously stated, the vertically disposed rotary brushes 26 are respectively driven by means of hydraulic brush drive motors 80, each of which is supplied with pressurized hydraulic fluid through the brush drive hydraulic fluid feed line 136 as controlled by the hydraulic brush drive motor control lever through the control console 28, wherein the hydraulic fluid return line from said motor 80 is not illustrated. The hydraulic brush drive motor 80 is mounted on a slidably adjustable belt tensioning bracket 138 and drives said brush 26 by motor drive pulley 140 communicating through V-belts 142 with the brush drive pulley 144 assembled to the brush drive shaft 146, wherein the above-described pulley and V-belt brush drive assembly is protectively enclosed by safety shield 148.

The brush drive shaft 146 is assembled to the brush mounting bracket plates 150 by means of sealed bearings 152, and said brush 26 is assembled upon said brush drive shaft 146 by means of the brush drive shaft assembly sleeve 154. It is by means of the above-described drive assembly that said vertically disposed rotary brushes 26 are driven to accomplish trailer unit 48 side panel scrubbing during machine 10 employment in washing operations.

As heretofore pointed out, the entire vertically disposed rotary brush assembly is pivotally mounted to the structural support members 16 of said machine 10 by means of brush mounting brackets 116 through pivot bolts 122, wherein the brush mounting brackets 116 pivot between the laminated shim bearing washers 156 which are compressively adjusted by means of the nut 158 force against the retainer washer 160, and by means of the aforementioned adjustment the freedom of pivotal deflection of said rotary brush assembly against the compressive resistance force of the hydraulic compression cylinder 120 is set and maintained. As will be noted in FIG. 4, the hydraulic compression cylinder 120 is assembled upon support member 162 by means of toggle bracket 164 and pivotally assembled at the other end thereof to brush mounting bracket lever arm 166 by means of the bolt 168 by which the piston 170 of said cylinder 120 is connected thereto through the piston connecting plate 172. It will be noted in FIG. 5 that the compression cylinder hydraulic fluid feed line 174 and the return line 176 are illustrated.

Figure 6:
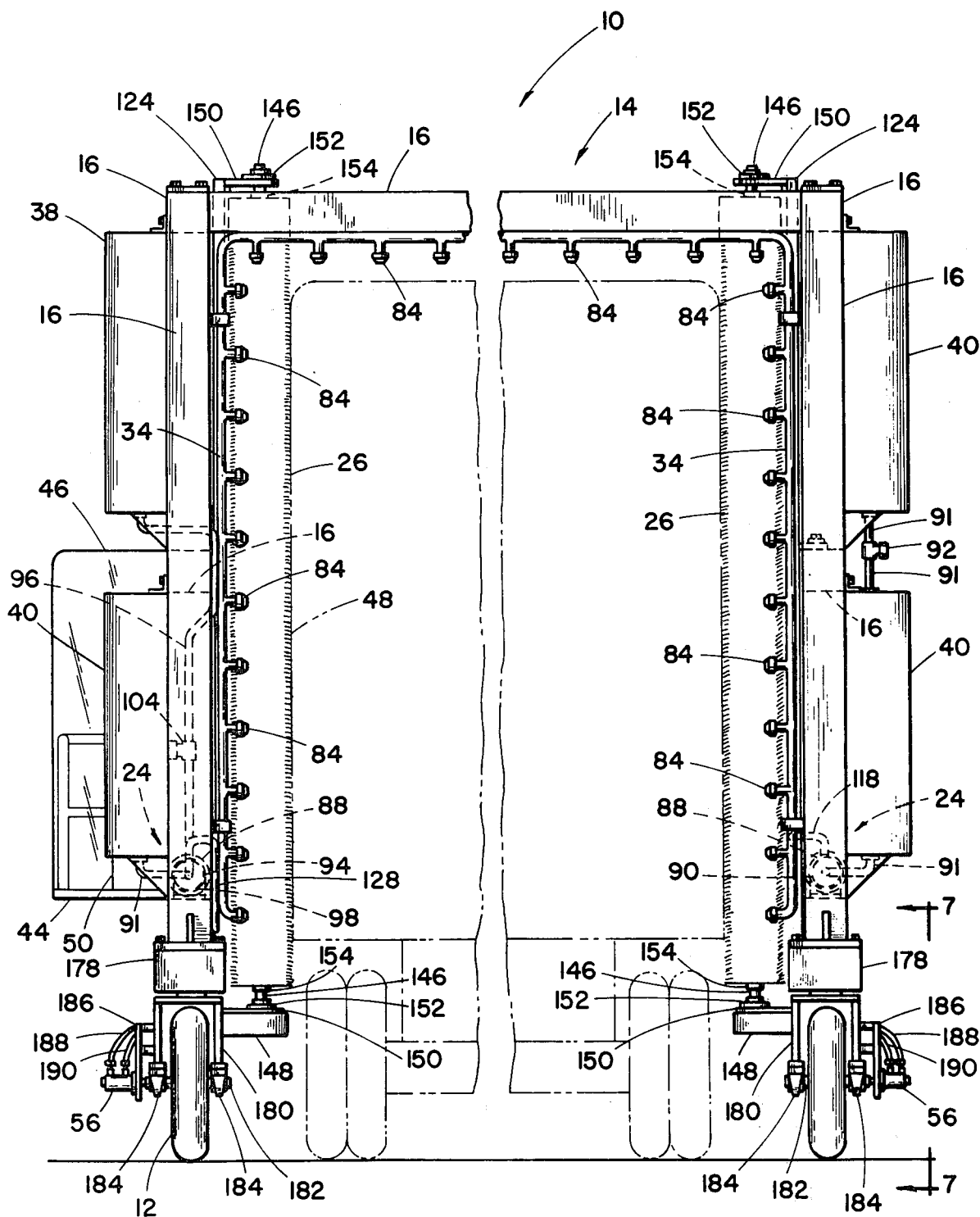
FIG. 6 is an enlarged end elevation of the washing machine shown in FIG. 1 as seen along the line 6 — 6 thereof.

Referring now to FIG. 6, wherein the operational wash cycle positioning of said machine 10 relative to a trailer unit 48, as seen along the line 6—6 of FIG. 1, is shown, there being particularly illustrated the engagement of said vertically disposed rotary brushes 26 respectively with the side panels of said trailer unit 48. Also shown in FIG. 6 are the wheel steering gear housings 178, the drive and steering wheel axle frame 180, the axle 182, axle bearings 184, the hydraulic wheel drive motor mounting frame 186, and the wheel drive motor hydraulic fluid feed line 188 and return line 190, all of which will be discussed in greater detail during a respective consideration next of FIG. 7 and FIG. 8, now referred to.

Figure 7:
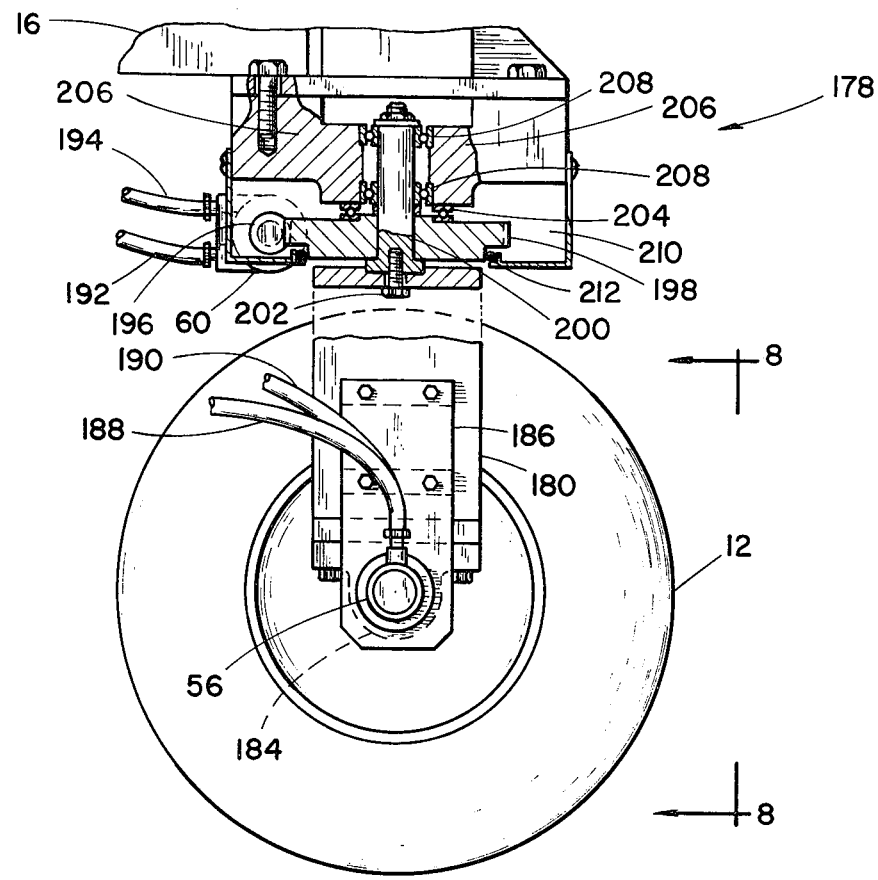
FIG. 7 is an enlarged side sectional elevation of a wheel drive and turning unit of the instant invention shown in FIG. 6 as seen along the line 7 — 7 thereof.

The view shown in FIG. 7 is an enlarged side sectional elevation of a wheel drive and turning unit assembly of said machine 10, wherein the turning or steering components thereof are comprised of the hydraulic wheel steering motor 60 provided with a steering motor hydraulic fluid infeed line 192 and return line 194 wherein said steering motor 60 is controlled through the control console 28 by means of the hydraulic wheel steering motor control lever 62 as previously described. Steerable turning of the wheels 12 is accomplished by means of simultaneously employing steering motors 60 to each axially rotate a worm 196 which engages a worm gear 198 thereby causing arcuate rotation of said worm gear 198 keyed to pivot shaft 200 which at the lower end thereof is secured to the steering wheel axle frame 180 by means of a torsion bolt 202, and thereby also causing a turning of said wheel 12 by means of turning the axle frame in which said wheel is supported. The worm gear 198 is supported in radial turning by the thrust bearing 204 which is positioned between the bearing housing 206 and the upper radial flat surface of said worm gear as illustrated in FIG. 7. In turn, the pivot shaft 200 is rotatably supported within the bearing housing 206 by a pair of radial bearings 208. The entire steering gear and bearing assemblies above-described are provided with a lubrication chamber 210, closed with a rotary seal 212, whereby constant lubrication thereof is provided.

Figure 8:
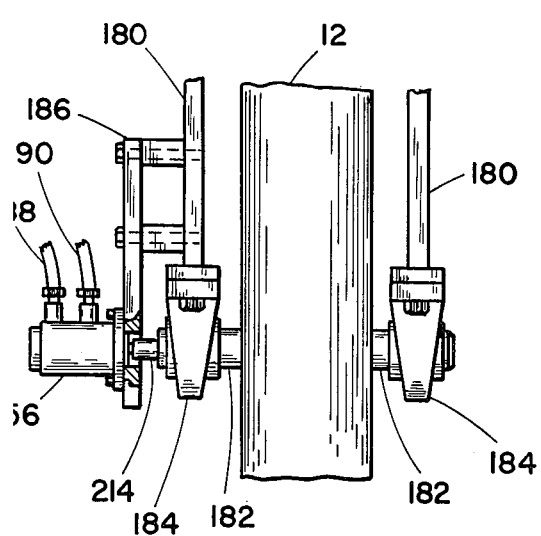
FIG. 8 is an end elevation of a wheel drive unit of the instant invention shown in FIG. 7 as seen along the line 8 — 8 thereof.

The view shown in FIG. 8 illustrates an enlarged fragmentary end elevation of the hydraulic wheel drive motor mounting frame 186 with the hydraulic wheel drive motor 56 assembled thereto and the drive shaft of said motor 56 axially connected by means of coupling 214 to the axle 182 whereby either forward or reverse driven displacement of said wheel 12, and therefore said machine 10, is accomplished.

Figure 9:
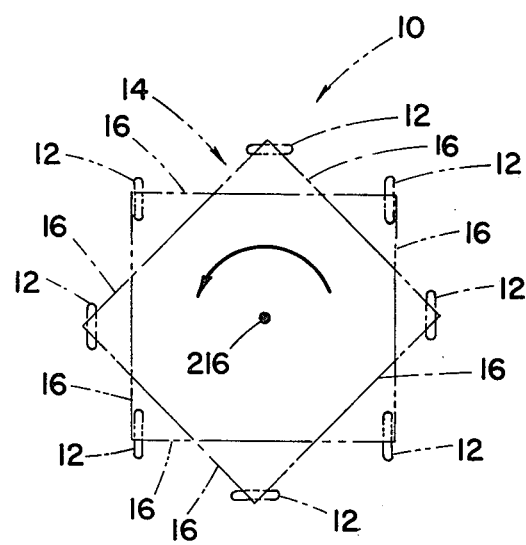
FIG. 9 is a top diagrammatic plan view of the washing machine comprising the instant invention wherein is illustrated the turning radius thereof achievable through cooperative wheel drive and turning unit steering.

Referring now to FIG. 9, which is a diagrammatic top plan view of the machine 10, wherein is illustrated the drivable turning capability thereof by coordinated employment of the steering and displacement means previously described. As shown in FIG. 9, it is possible for a driver/operator to turn said machine 10 in place about a central axis pivot point 216 of said machine 10, thereby demonstrating the high degree of manuverability of said machine 10.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A self-propelled and contained trailer washing machine powered by an integrally assembled internal combustion engine which also concurrently drives an auxiliary electrical generator power unit and a hydraulic pump power unit respectively regulated through an integral machine drive and operational unit control console installed within a protectively enclosed driver/operator station wherein said machine is adapted to mobily straddle the lateral rectangular shaped width and height configuration of a statically positioned over-the-road commercial trailer unit body and operable to successively and selectively accomplish a sequential low-pressure spray application of washing material upon and then brushing of the opposing longitudinal sides followed by a high-pressure water spray rinsing of the rear doors continuing in a longitudinally progressive simultaneous high-pressure water spray rinsing of the top and opposing longitudinal sides and finally a high-pressure water spray rinsing of the front panel of said trailer unit body during a single self-propelled laterally straddling longitudinally displaced driven pass of said machine along said trailer unit body, said machine comprising in combination:

a. an inverted U-shaped longitudinally disposed support frame structure having interconnected horizontal and vertical members assembled upon a plurality of driven wheels wherein said support frame structure is reinforced by a plurality of diagonally assembled threadably adjustable structural support brace struts, b. a low-pressure detergent material spray application means wherein an integral detergent material storage tank assembled within and carried upon the support frame structure of said machine communicates by a conduit means to the intake of a variable speed low-pressure centrifugal pump powered by a first direct current electric motor variably regulated through said machine drive and operational unit control console, further communicating through said pump to a discharge side conduit extending therefrom in the form of an inverted U-shaped arch structure having a plurality of spaced longitudinally aligned spray nozzles threadably assembled in opposing relationship thereto along the interior vertical leg members thereof, c. a low-pressure brightener material spray application means wherein an integral impervious plastic brightener material storage tank assembled within and carried upon the support frame structure of said machine communicates by a plastic conduit means to the intake of a variable speed low-pressure plastic centrifugal pump powered by a second direct current electric motor variably regulated through said machine drive and operational unit control console, further communicating through said plastic pump to a discharge side plastic conduit extending therefrom in the form of an inverted U-shaped arch structure having a plurality of spaced longitudinally aligned spray nozzles threadably assembled in opposing relationship thereto along the interior vertical leg members thereof.

d. a set of laterally spaced vertically disposed rotary brushes carried upon the support frame structure of said machine and adapted to simultaneously engage and scrub the opposing longitudinal sides of said trailer while being individually and respectively arcuately deflectable unidirectionally rearward of the direction of travel of said machine about a plurality of axially aligned pivot bolts and against the resistant force of a hydraulic compression cylinder wherein each of said set of rotary brushes is provided with an arcuate deflection tensioning means being a laminated shim bearing washer respectively insertably assembled upon said axially aligned pivot bolts and compressively engaged respectively against a vertically disposed rotary brush mounting bracket by means of a nut threadably assembled respectively upon each of said pivot bolts, and e. a high-pressure water spray rinsing means wherein a plurality of conduit communicating interconnected integral water rinse storage tanks assembled within and carried upon the support frame structure of said machine communicate by a feed conduit means to the intake of at least one of a constant speed high-pressure piston pump respectively powered by a fixed speed direct current electric motor operable through said machine drive and operational unit control console, further communicating through said piston pump to a discharge side conduit extending therefrom in the form of an inverted U-shaped arch structure having a plurality of spaced longitudinally aligned spray nozzles threadably assembled thereto interior of the upper leg member and in opposing relationship thereto along the interior of the respective vertical leg members thereof.

2. The machine according to claim 1 in which said plurality of driven wheels are individually and respectively powered in forward and reverse displacement by a hydraulic wheel drive motor.

3. The machine according to claim 1 in which said plurality of driven wheels are individually and respectively provided with a reversable hydraulic wheel steering motor.

4. The machine according to claim 1 in which a first control lever for variable regulation of said low-pressure detergent material spray application means embodies a switch to activate said high-pressure water spray rinsing application means.

5. The machine according to claim 1 in which a second control lever for variable regulation of said low-pressure brightener material spray application means embodies a switch to activate said high-pressure water spray rinsing application means.

* * * * *

UNITED STATES PATENT AND TRADEMARK OFFICE
CERTIFICATE OF CORRECTION

PATENT NO. : 4,050,109
DATED : September 27, 1977
INVENTOR(S) : Samuel M. Learned It is certified that error appears in the above-identified patent and that said Letters Patent are hereby corrected as shown below:

Column 4, line 39: Delete "21" and substitute ---1---.

Column 6, lines 14 & 15: Delete "by means of the detergent material".

Column 7, line 62: Delete "time" and substitute ---rinse---.

Signed and Sealed this

Seventh Day of February 1978

[SEAL]

Attest:

RUTH C. MASON
Attesting Officer

LUTRELLE F. PARKER
Acting Commissioner of Patents and Trademarks